United States Patent [19]

Paul et al.

[11] Patent Number: 5,051,799
[45] Date of Patent: Sep. 24, 1991

[54] DIGITAL OUTPUT TRANSDUCER

[76] Inventors: Jon D. Paul, 2800 Third St., San Francisco, Calif. 94107; Mark D. Clayton, Box 541, RD 4, New Windsor, N.Y. 12550; Anthony M. Agnello, 407 Prospect Ave., Princeton, N.J. 08540

[21] Appl. No.: 313,069

[22] Filed: Feb. 17, 1989

[51] Int. Cl.$^5$ .................. H04B 14/04; H04R 19/04
[52] U.S. Cl. ........................... 375/25; 375/27; 381/168
[58] Field of Search ............. 375/27, 25; 381/168, 381/172, 181, 111, 122, 150; 367/21, 66, 67, 132, 140; 455/601, 608

[56] References Cited

U.S. PATENT DOCUMENTS

| | | | |
|---|---|---|---|
| 2,801,281 | 7/1957 | Oliver et al. | 375/27 X |
| 3,723,879 | 3/1973 | Kaul et al. | 375/27 |
| 4,370,523 | 1/1983 | Bäder | 375/25 X |
| 4,616,349 | 10/1986 | Shirley | 367/66 |
| 4,706,261 | 11/1987 | Torre et al. | 375/27 |
| 4,907,248 | 3/1990 | Bretl | 375/27 |

Primary Examiner—Douglas W. Olms
Assistant Examiner—Ralph Smith

[57] ABSTRACT

Contained within a single housing (120), is a transducer (100) for receiving an acoustic signal, an analog-to-digital converter (108), which changes the output of transducer (100) into a series of digital pulses representing the incoming acoustic signal. The output of the system may be in serial form. This serial output (114) is transmitted (116) to a remote receiver (122) by wires, light, optical fibers, or as radio waves. The receiver's (122) output (124) is applied to a digital system (130), which processes or reconstructs the acoustic signal. The system may include a digital signal processor (300) within the housing (120) for processing the signal (110) prior to transmission. The analog to digital converter may be a delta-sigma oversampling type, or a sub-ranging floating point type, or use adaptive differential pulse code modulation. Power may be derived remotely by transmission over the signal medium.

20 Claims, 5 Drawing Sheets

DIGITAL OUTPUT TRANSDUCER

BACKGROUND

2. Field Of The Invention

This invention relates to transducers that convert sound, vibration, or other forms of varying energy into electrical signals for transmission, storage, display, or analysis, such as microphones, pick-ups, and other audio transducers.

2. Description of Prior Art

Transducers convert various forms of energy, such as light, sound, heat, motion, etc., from one form to another. Transducers used in the electronics industry include microphones, pick-ups, accelerometers, and other types of transducers, which are well known to those skilled in the art. In general, these provide some form of electrical analog output signal; the voltage, current, or some other quality of the signal, varies in accordance with the input to the transducer. Many of these transducers require preamplifiers, to boost the output signals's level; transform impedance, (for example, high impedance to low impedance); and/or to drive the cable that connects the transducer to the equipment that is receiving and utilizing the transducer's output signals.

A typical example of a transducer is a studio sound microphone, in which sound wave are converted into a very low level electrical signal by a microphone element, such as a magnetic-dynamic, electrostatic, or crystal element. The output of the microphone element is then applied to an impedance matching transformer, and/or a preamplifier, to convert the signal to a suitable impedance level and voltage for transmission. The transformed electrical signal is applied to a cable, which may be 100 feet or more in length. The far end of the cable enters another transformer, amplifier, or other interface device, and the output of this, in turn, is used by a studio console, tape recorders, signal analyzer, etc. to record or process the sound originally produced at the transducer.

The analog technique of transducing and transmitting audio signals has been in use for over 100 years, and is still in use, even in studios with modern digital tape recording. The fidelity of analog transmission is restricted by interference, such as noise, distortion, the dynamic range of analog systems, ambient magnetic and electrical fields, etc. The limited dynamic range (60–70 dB) and high (up to 3%) harmonic distortion of the analog recording and reproducing process has hitherto masked the transmission effects.

Nowadays the advent of digital recording and reproducing techniques with over 90 dB of dynamic range and below 0.01% harmonic distortion have made the problems of the analog transmission system painfully apparent. Lois D. Fielder, in the article, "Dynamic-Range Requirement for Subjectively Noise-Free Reproduction of Music", in the Journal of the Audio Engineering Society, Vol. 30, No. 7/8, 1982 July/August, pp. 504–510, states that 90–118 dB of dynamic range is needed to accurately record and reproduce classical music. Even more dynamic range is needed to accurately reproduce a live "rock and roll" concert or a jet plane flyover. In most currently used systems, the digital audio recording process usually places the analog-to-digital (A/D) converter only after the signal is processed by an analog transducer, analog preamplifier, analog transmission medium, and analog amplifier or transformer. This means that the noise, distortion, and interference of the analog transmission system will be unavoidably recorded and reproduced by the digital recording.

An analog transmission usually has a single path of conduction, such as a wire pair. Digital transmission usually needs several conductors or paths. The cost and complexity of the overall system increases with the number of transmission paths.

The signals from the transducer are often processed after transmission, for sound modification or improvement in their quality. This involves tone controls, equalizers, noise gates, anti-feedback, and other forms of processing in the time or frequency domain. These processors are physically large and power consuming, and are generally located remotely from the transducer. These processors cannot be easily controlled by someone at the transducer end, but need to be controlled locally. In a sound studio, for example, the volume and tone of a hand-held microphone cannot be changed by the microphone's user.

The resolution of existing A/D conversion techniques is limited by theoretical considerations and practical implementation to a number of bits, which is not sufficient to accurately represent the full dynamic range of an audio signal such as a live concert. High resolution A/D converters are large, power consuming, and expensive.

Also, the requirement for a power source and conduction of signals generally dictates the use of wires and cables to connect the transducer with the equipment that receives the signal. In many applications, these wires pose operational problems and can constitute electrical hazards. So called "wireless" microphones, using radio or infrared, have been used to overcome this problem; but these still operate in the analog domain and ususally impose additional noise and distortion penalties beyond those encountered in a wired system. The wireless microphones use self-cointained batteries, but these may be drained of energy and grow weak at any time, thus interrupting transmission.

The existing techniques of A/D conversion require that the analog signal be bandlimited by an input anti-aliasing filter, and be sampled by a sample-and-hold circuit prior to A/D conversion. These components require additional power and space and also degrade dynamic range and harmonic distortion performance.

OBJECT AND ADVANTAGES

It is therefore an object of the present invention to provide better audio reproduction with increased dynamic range, and reduced distortion and noise.

It is another object of the present invention to provide a hand-held digital output transducer without the use of a low pass filter or sample-and-hold circuit.

It is another object of the present invention to provide a digital transducer system that eliminates the noise, distortion, and interference susceptibility of the analog transmissioin medium and provides for the most accurate possible reproduction of the transducer output.

It is a further object of the invention to provide a digital transducer system that is relatively low in cost, consumes low power, is lightweight and small in physical size, so as to provide an easily hand-held device.

It is another object of the present invention to include a self-contained power source within the transducer's housing, or to derived the power directily from a two-way transmission medium.

It is another object of the present invention to provide for the transmission of the signal in a standardized serial digital form, such as the industry standard, Audio Engineering Society/European Broadcasting Union (AES/EBU), as described in the Committee Consultative on International Radio Recommendation, Number 647, 1986, so as to provide a self-contained digital transducer, which can transmit digital outputs in an industry standard format. It is yet another object of the present invention to provide a hand-held digital transducer with an A/D conversion of greater than 16 bits.

It is yet another object of the present invention to provide a digital transducer with built-in digital signal processing capability for the control of frequency response, equalization, dynamic response, gain control or other parameters, within the transducer's housing.

There are many possible applications for such a system, besides that of audio microphones. For Example, pick-ups for musical instruments, such as guitar and drum pick-ups, could be used. In the field of biophysics, transducers for biological signals, such as electroencephalograms, ballistic cardiographs, etc., can be used. In industrial testing, pick-ups, such as accelerometers, strain gauges, and geophones, can use the techniques of this invention. Military applications include hydrophones for underwater sound, microphones for intelligence collection, etc. Virtually any form of varying energy could be transduced and transmitted over any distance with real life fidelity of up to 96-140 dB of dynamic range, and with virtually no distortion, using the present invention. Still further objects and advantages will become apparent from a consideration of the ensuing description and accompanying drawings.

DESCRIPTION

Figure 1:
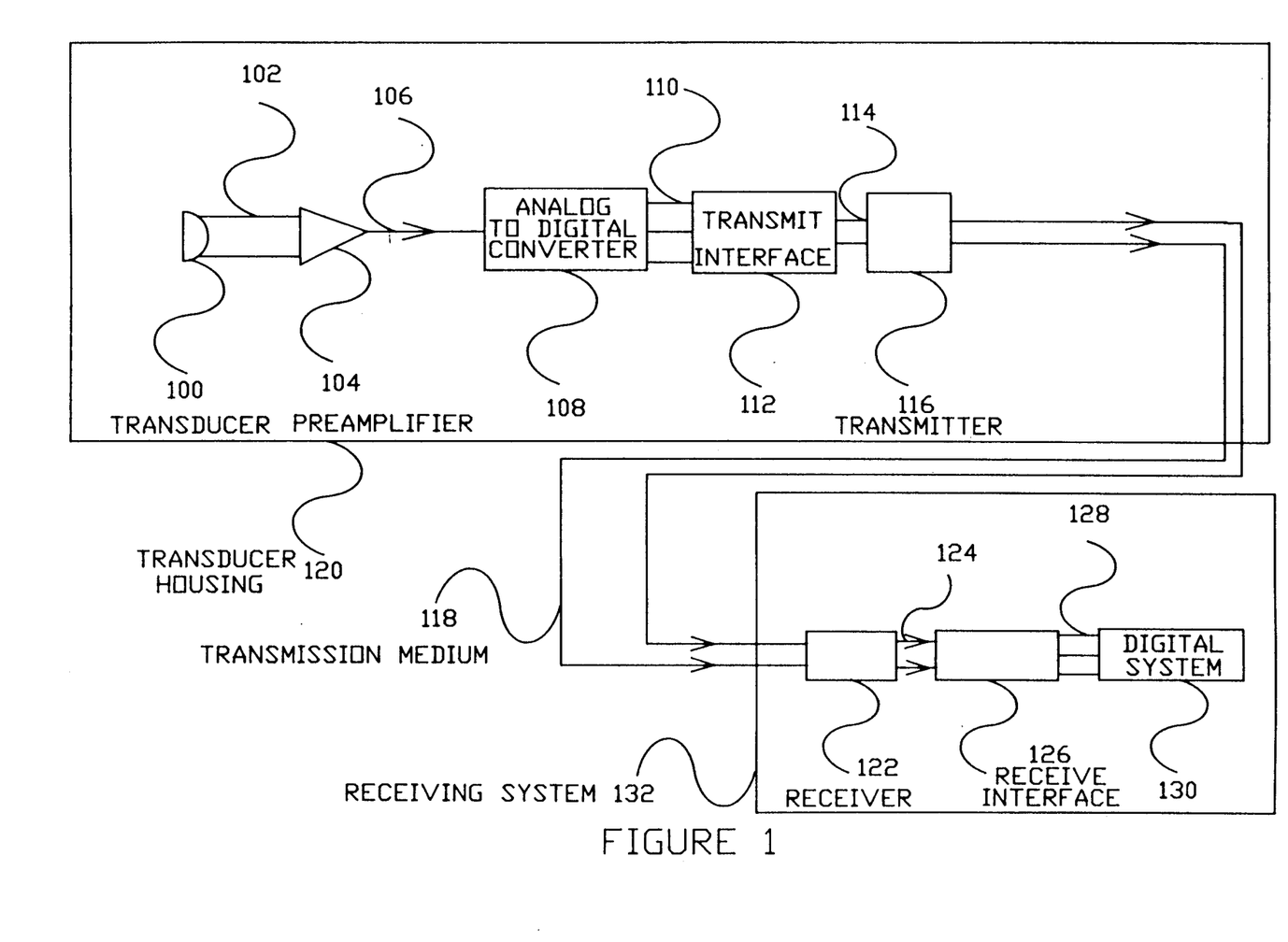
FIG. 1 is a general block diagram of a digital output transducing system in accordance with the present invention.

FIG. 1—BASIC SYSTEM

FIG. 1 shows a block diagram of the digital output transducing system. In FIG. 1, the tranducer's housing is represented as a box, 120. This could be a hand-held microphone housing, or other enclosure around the transducer's components. The transducer is connected to a receiving system 132 by a transmission medium 118. In accordance with the invention, incoming sound, vibration, or other forms of energy are converted into an electrical signal by a transducer 100. Transducer 100 may be a microphone element, vibration pick-up, or any other device which converts any form of time varying energy into an electrical signal. The output 102, of the transducer 100, may be at a low signal level. A preamplifier 104 can be used to increase the signal amplitude to a level which fully exploits the dynamic range of the succeeding circuitry. This preamplifier may be an operational amplifier, instrument amplifier, differential amplifier, etc. and provides voltage gain, current to voltage conversion and/or impedance conversion, as needed by the transducer. For common microphone elements with millivolts of output, preamplifier 104 has a gain of 40 dB.

The output 106 of preamplifier 104, is applied to an A/D converter 108, which samples the signal at periodic intervals, frequently enough to completely reconstruct the signal. The sampling rate is in accordance with the Nyquist sampling theory as described in the literature, e.gl. by Mischa Schwartz, "Information Transmission, Modulation and Noise", McGraw Hill, 1959, pp. 169-180, sections 4-5, 4-6. For example, with an input signal of bandwidth B hertz, the Nyquist sampling rate is 2B hertz, andd this would be the minimum sampling frequency for the analog-to-digital conversion process.

A/D converter 108 converts the signal 106 into a digital representation of the analog signal from the transducer 100. There are many techniques to implement the A/D converter indicated in the Figures as 108. The simplest technique is the use of successive approximation or dual slope converters. For high resolution, 16 bit or higher, and use with audio bandwidth signals, conversion times of 20 microseconds or less are required. These converter techniques result in excessive noise, distortion, and power consumption. In addition, the input signal must be band limited through a low pass filter and held constant during the conversion time by a separate sample-and-hold circuit prior to entering the A/D converter.

These problems have led to the search for better and faster conversion techniques, which obviate the need for these additional components in front of the converter. The preferred technique is to use an oversampling converter in which the input signal is applied to a low resolution (1-6 bits) very high speed A/D converter, sampling the input at say, 64-128 times the audio sampling frequency. This technique is described in: "A Stereo 16 bit Delta-Sigma A/D Converter for Digital Audio", by D. R. Welland, B. P. Del Signore, B. J. Swanson, T. Tanaka, K. Hamashita, S. Hara, K. Takasuka; paper presented at 85th Convention of the Audio Engineering Society, November 1988 and "Design and Implementation of an Audio 18-Bit Analog-to-Digital Converter Using Oversampling Techniques", by Robert W. Adams, Journal of the Audio Engineering Society, Vol. 34, No. 3, March 1986.

It can be shown that all of the information required for an N bit conversion at fs sampling frequency is obtained by oversampling at M times fs with a resolution of N minus $\log_2 M$.

The decimation of the oversampled data down to the audio frequency sampling rate is done in the digital domain by digital filtering, decimation, etc., as described in the references. A single integrated circuit can contain the high speed A/D, latch, decimator, digital filter etc., needed for a complete a/d converter.

There are several different topoloigies for this technique, including: feedback differential converters, Delta modulation, differential pulse code modulation, feedback pulse code modulation, and noise shaping. All of these techniques are similar and differ only in the position of input and feedback components, and in the number of bits in the high speed oversampling converter. The output of these types of converters is linear pulse code modulation, and practical implementations can yield 16 or more bits of resolution.

The successive approximation and dual slope A/D techniques require an input anti-aliasing low pass filter to bandlimit the input signal prior to sampling, and a sample-and-hold circuit, which samples the input signal periodically and provides a held output constant between sample times, to the A/D converter. These components are is necessary because these converters produce erroneous results if the input voltage changes during the course of a conversion cycle.

The oversampling A/D converters do not required either of these components and, thus, provide substantial savings in space, power consumption, and cost, which is particularly important for the present invention. The function of the input low pass filter is replaced by a digital filter, within the oversampling converter, which operates on the oversampled data prior to exiting the A/D converter. The effect of this digital low pass filter is to provide the same function of anti-aliasing as the external low pass filter serves in the successive approximation system.

The oversampling converter input stage, which is a high speed comparator or a "flash" converter, which is generally 3-6 bits in resolution. Because these types of converter circuits are composed of high speed comparators, they operate continuously and do not require a sampled-and-held input. The instant of sampling is determined within the oversampling converter by a digital latch on the data coming out of the comparator or flash A/D. This internal latch replaces the function of the external sample-and-hold.

By using an oversampling A/D converter, the overall volume, complexity, cost, and power consumption of the system is greatly reduced, to the point where a hand-held, lightweight conversion system within a microphone housing becomes practical. Additonal savings are realized in the elimination of the low-pass filter and sample and hold. Although other techniques of A/D conversion can be used in the present invention, the oversampling technique is uniquely suitable and is employed in the preferred embodiment. For this reason, no separate sample-and-hold or low pass filter are indicated in the figures, although they would be used if a non-oversampling A/D converter were used for 108.

Commercially available integrated circuits, such as the Crystal Semiconductor part number CS-5326, include all of these functions within a single package in the dimensions of an industry standard 28 pin or 16 pin, dual in line package.

The output of A/D converter 108 is a stream of digital bits on lines 110. This can be in serial or parallel form. If serial data is used, then appropriate synchronization clocks will be generated by the A/D converter, and these must be transmitted along with the serial data. The A/D converter output data 110 is converted to a standardized form suitable for transmission by a transmit interface 112. This interface can include serial to parallel or parallel to serial conversion, error correcting (parity) bit generation, and other forms of processing well known to those of skill in the art.

The output 114 of the transmit interface is connected to a transmitter 116. When transmission medium 118, is a cable, the transmitter 116 can be an amplifier for increasing the power level of the signal. This is the simplest, preferred transmitter and medium. When a wireleses transmission medium 118 is used, such as infrared, optical, radio, etc., the transmitter 116 converts the electrical signal on line 114 into wheatever form of energy the transmission medium conducts. For example, in the case of light transmission, the transmitter 116 is an amplifier driving a light emitting diode or solid state diode laser. For radio transmission, the transmitter is a radio transmitter of appropriate frequency and modulation.

The output signal form transmitter 116 leaves the transducer housing 120 and enters transmission medium 118. In the preferred embodiment, the transmission medium 118 can be a cable for wired electrical transmission. For optical or radio transmission, the air, vacuum or an optical fiber transmits the signal as electromagnetic waves. At the receiving end of the transmission medium 118, the signal enters the receiving system 132. The signal from 118 is applied to a receiver 122. Receiver 122 converts the optical, radio, or electrical energy in the transmission medium 118 back into an electrical signal of suitable level for further processing. When transmission medium 118 is a cable, the receiver 122 is a buffer amplifier or impedance matching transformer. For optical transmission, the receiver 122 is a photodiode coupled to a suitable amplifier. A radio receiver is used for the radio link embodiment of the invention.

The output 124 of receiver 122 is connected to a receive interface 126. Receive interface 126 converts the incoming data on 124, for example, serial data with clocks or parallel data, into a data format 128, which is in a form that can be utilized by the digital system 130. This operation is the inverse of the action of the transmit interface, 112.

Digital system 130 has suitable means to interpret these signals and reconstruct the original transducer waveform. Commercially available digita signal processing integrated circuits, such as the Motorola DSP56001 and Texas Instrument TMS32020, have a built-in serial interface to receive such data for further processing in the digital domain, and can be easily connected to a serial transmission system, either directly, or with a simple receive interface 126.

The digital system 130 can store the signal for later use, thus acting like a digital tape recorder. It can also analyze the signal 128 for display to a user, for example, as an oscilloscope. It can also change the signal back into the analog domain for interface with analog equipment or for immediate listening by the user.

The overall result of the complete system is a high quality digital audio microphone or other transducer, without the noise pick-up and distortion of conventional analog output transducers. Since the signal is transmitted in digital form, and the resolution of the conversion process is greater than the dynamic range of the incoming signal, the reproduction is virtually perfect, and there is no effect of any interference or noise in the transmission process.

Figure 2:
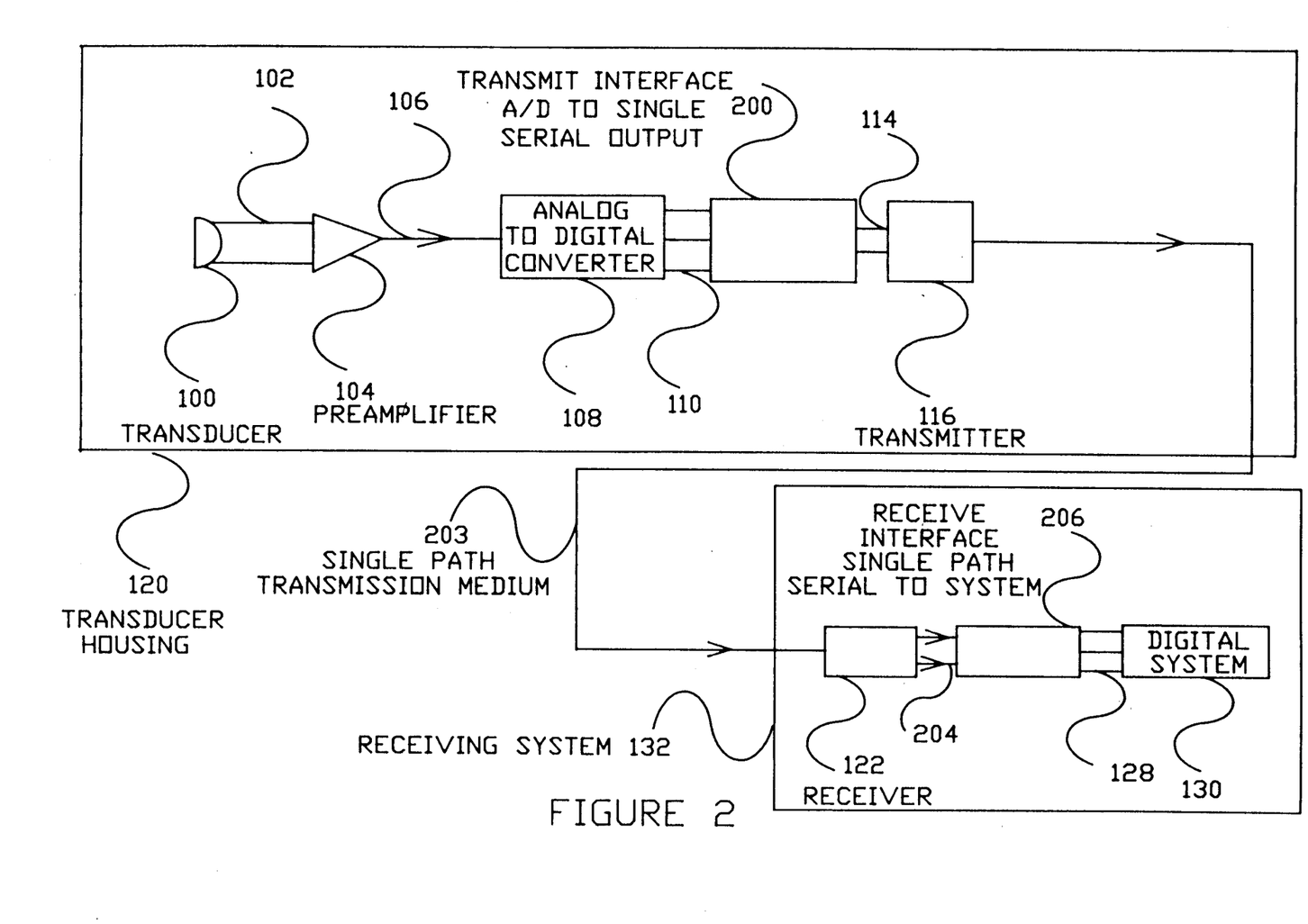
FIG. 2 is a block diagram of the system of the present invention including additional circuitry for a single-path, serial digital transmission medium.

DESCRIPTION—FIG. 2—SYSTEM WITH SINGLE PATH SERIAL DATA

The system of FIG. 1 may use plural transmission paths to interconnect the transmitter and receiver to provide for synchronization of the transmitter and receiver, or for the transmission of parallel data paths. It is highly desirable in the case of optical transmission, radio signals, or even cables, to minimize the number of transmission paths, since each additional path adds cost, size, and power consumption. In the case of parallel systems, it is common to provide one path per bit of transmitted data, thus eliminating them from further consideration. In serial systems, it is common to provide separate transmission paths for bit clock pulses, word clock pulses, and the data stream itself, thus requiring three paths.

Referring now to FIG. 2, the several transmission paths of FIG. 1 are reduced to a single path by multiplexing. The transmit interface 112 of FIG. 1 is replaced by a single output transmit interface, 200, and the interface 122 of FIG. 1 is replaced with a single path receive interface 206. The single output transmit interface 200 takes the output of A/D converter 108 and processes it into a single path, serial digital signal, 202 for transmission on a single path communication medium, 203, which replaces the transmission medium 118 of FIG 1. This signal includes all of the data bits emerging from the A/D converter 108, as well as clock and frame synchronization pulses. The various techniques of multiplexing used to achieve this are well known to those skilled in the art, and include phase and frequency modulation, amplitude modulation, and time division multiplexing.

In addition, the transmit interface may include coding techniques, such as the Reed-Soloman code, which insert "check bits" derived from the data, so as to signal the receiving equipment in the event of missing of distorted data. These additional check bits include parity bits, cyclic redundancy check characters (CRC), and other such error detecting and error correcting codes. It is possible to reconstruct a limited number of missing or garble data bits at the receive side with proper interface and coding. These techniques are easily applied to this type of system.

A preferred embodiment employs the industry standard Audio Engineering society/European Broadcasting Union (AES/EBU) standard for a digital audio serial interface, as described in the Committee Consultative on International Radio Recommendation, Number 647, 1986. This format can transmit up to 24 bits of data on a single serial channel, and includes encoded clock bits, frame symbols, and numerous other data bits to accomplish service and communication functions.

Other audio industry serial interface formats can be used such as Sony-Phillips Digital Interface Format (S/PDIF), SDIFF-2, PRODIGI, JVC, F1, SDIF. These all include desirable coding features such as polarity insensitivity, easy clock recovery, redundancy of data, single line transmission, etc.

Interface 200 changes the serial data bit stream into a format such as the The AES/EBU standard for transmission on a single wire pair or other similar channel transmission medium. Commercially available integrated circuits, such as the Yamaha part number YM3613B digital audio interface transmitter, may be used for this function. This part includes a phase lock loop for synchronization, inputs for additional information, such as sub-codes, CRC check generation, preamble, parity, generation, and biphase modulation of the output.

For example, when A/D converter 108 is of the serial output type, its output includes a frame synchronization pulse at the sampling frequency to signal the beginning of a data word. In addition, a clock is generated at frequency N times high, where N is the number of bits of resolution. These clock lines are indicated in FIG. 2 by the three lines 110 from the A/D converter 108 to the transmit interface 200. In this embodiment, interface 200 takes these three signals and multiplexes them on to a single line serial signal, 202.

The transmission medium 203 consists of a single channel of serial data, which contains all of the data necessary to reconstruct the signal which originally acted on the transducer 100. Transmitter 116 and receiver 122 remain the same as in FIG. 1, but now need only carry a single channel of data. A receive interface 206 performs the inverse function of transmit interface 200, and takes the single serial bit stream of data, 204 emering from the receiver 122, and reconstructs the data stream, clock, and frame synchronization signals, as well as other data as necessary for output on line 128 to the digital system 130.

Interface 206 ususally includes a phase lock loop to recover a low jitter, stable clock from the incoming coded data stream. Interface 206 can also include a serial to parallel converter in cases where parallel output is desirable. Error code detecting and correcting are also included in this interface. The receive interface is also available as a single integrated circuit, such as the commercially available Yamaha YM36236B, which convertes a single path serial AES/EBU input into a 24 bit serial data, bit clock and frame synchronization pulse.

Figure 3:
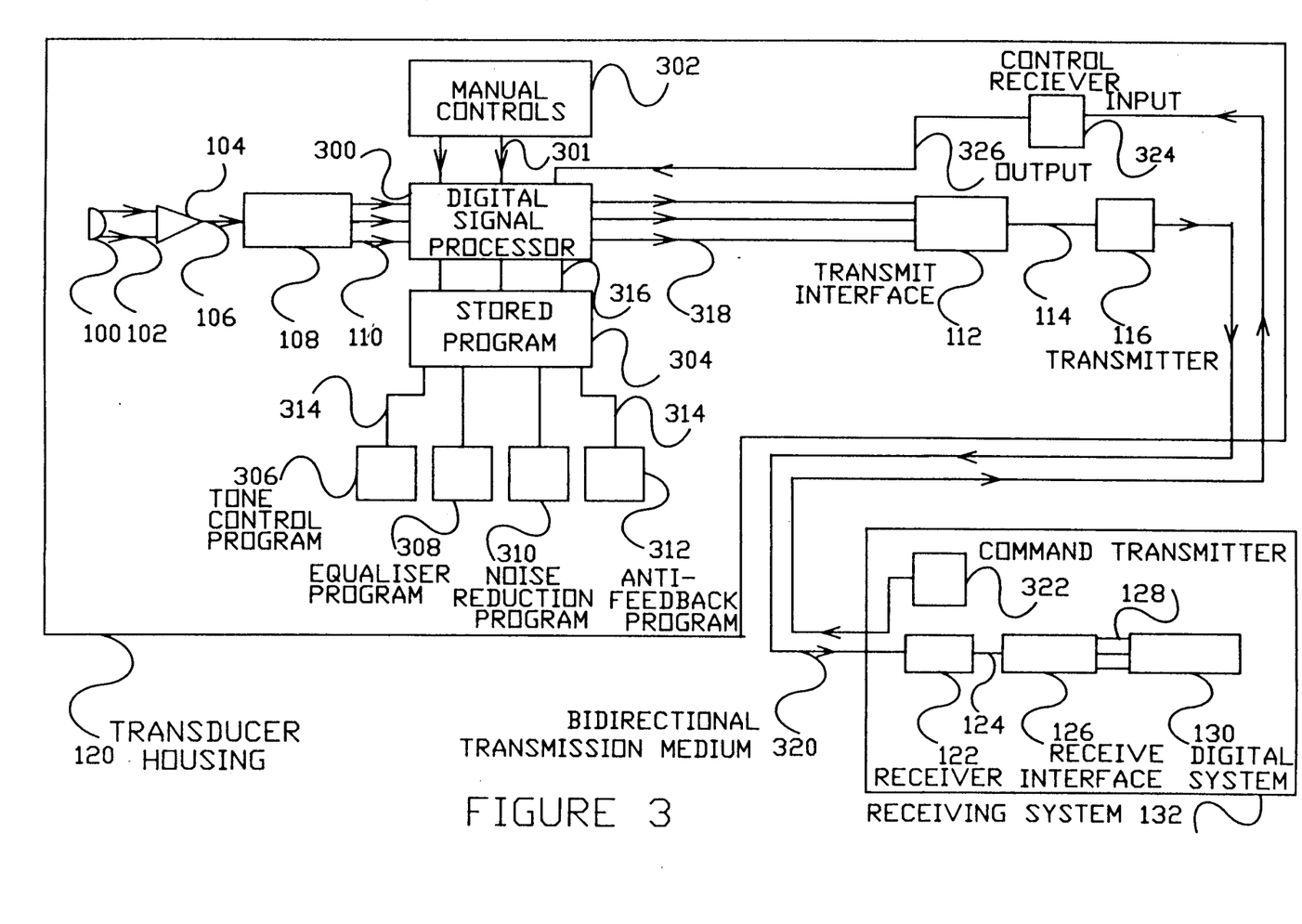
FIG. 3 is a block diagram of the system, including the additional circuitry for a built-in digital signal processor within the digital output transducer housing.

DESCRIPTION—FIG. 3—SYSTEM WITH SELF-CONTAINED DIGITAL PREPROCESSING

This system shown in FIG. 3 will digitally process the transduced signal, prior to its transmission as digital data. This is done by placing a digital signal processing integrated circuit, such as the Motorola DSP56001, inside of the tranducer housing, FIG. 3 is similar to FIG. 1, except that the data 110 coming out of A/D converter 108 is applied to a local digital signal processor 300 prior to being applied to transmitter interface 112 Local digital signal processor 300 can performs a number of tasks under the control of a program 304, which can access 314 various processing sub-routines, such as: automatic gain control, tone control 306, equalization 308, noise reduction 310, filtering, and anti-feedback 312, etc. The signal processor 300 may be controlled 301 by the user with manual controls such push buttons, keyboards, or rotary encoders, 302. Thus, the signal is digitally pre-processed. This allows the user of the transducer to locally control it, and applies the processing before transmission, rather than after transmission, as done in the prior art.

The digital signal processor 300 may also be controlled remotely from the receive end of the transmission medium. This feature allows the receive side digital system, 130, or a user located remotely at the receive side of the transmission medium to manipulate the frequency response and dynamics of the transmitted signal at the transducer. The additional components necessary to implement this are a command transmitter 322, a bi-directional transmission medium 320, and a command receiver 324. The command transmitter 322 sends control information from the receiving system 132 towards the transducer 120 over the bi-directional transmission medium 320. A multi conductor cable or a single transmission path with appropriate multiplexing could be used for this function.

The use of an industry standard control format, such as the

Musical Instrument Digital Interface (MIDI), as published by the International MIDI User's Group in 1983, is preferred. The MIDI format is commonly used for control of music synthesizers and digital sound effects boxes.

The command information arriving at the transducer 120 side of the transmission medium 320 is goes to a command receiver 324, located in the transducer housing 120. The command is converted by the receiver 324 into a digital word 326 suitable for use by digital signal processor 300. Procesor 300 responds to the command under control of program 304, and appropriately modifies the output data 318.

This allows the digital processor 300 to be under the control of the user of the transducer 120 or to be remotely controlled from at the receive system 132. This feature is most useful in situations where the transducer is difficult to reach or manipulate, but where the signals being transmitted require modification prior to transmission.

Figure 4:
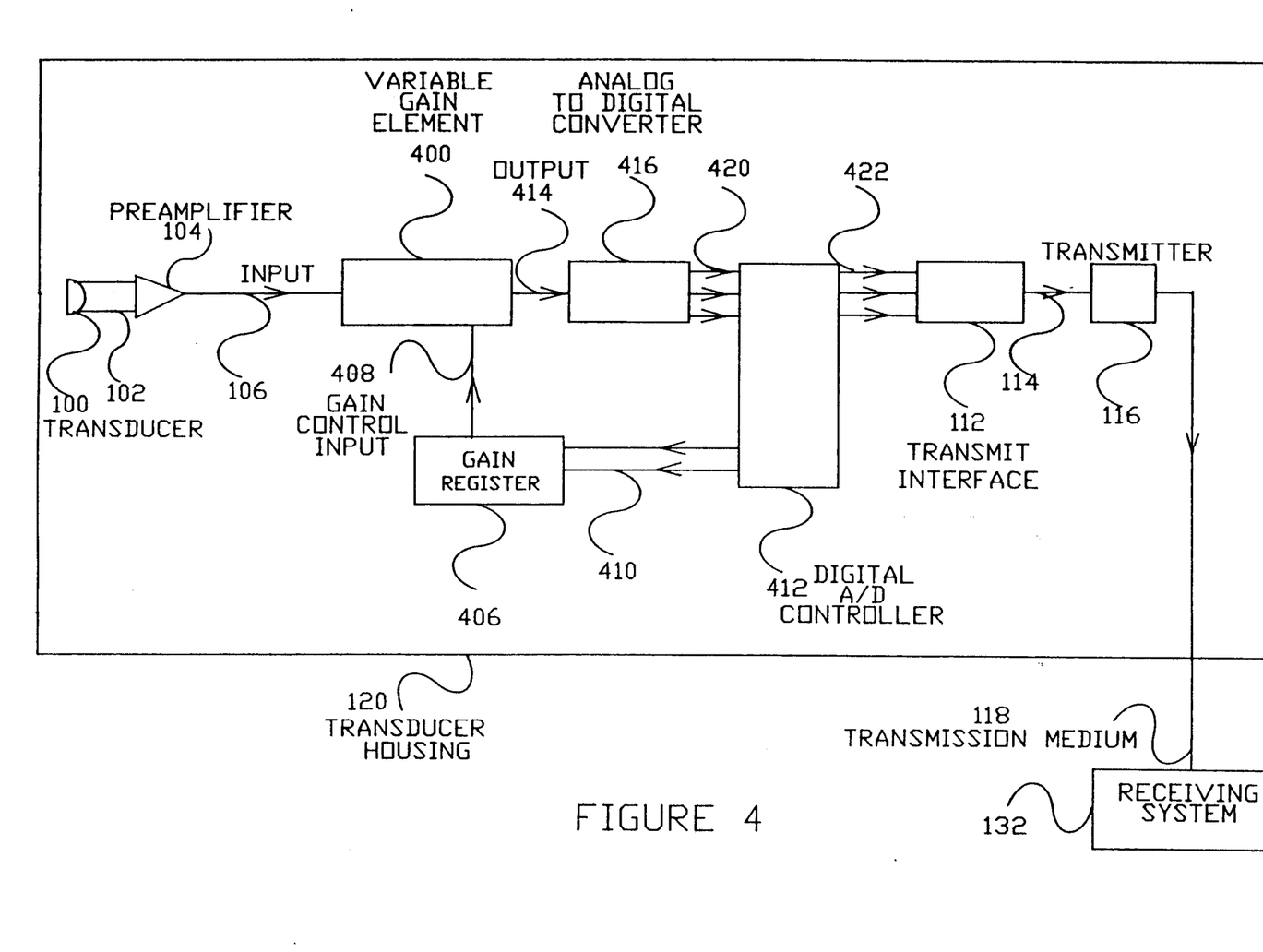
FIG. 4 is a block diagram of the system, further including components necessary for implementing a subranging A/D converter with improved resolution.

DESCRIPTION—FIG. 4—SUB-RANGING A/D CONVERTER

As mentioned previously, the dynamic range of signals can be greater than 118 dB. This would require an A/D converter with 20 bit resolution. The dynamic range can be even greater for vibration signals, drum pick-ups, etc. The AES/EBU serial data format supports word lengths of up to 24 bits, as do commonly used digital signal processing CPU chips, such as the Motorola DSP56001.

The state of the art in audio frequency A/D converters is only now reaching 18-20 bits. These converters are large (6×6 inches), expensive ($400), and require substantial power (5-10 watts). These limitations prohibit their use in lightweight, portable, low cost, handheld applications, such as the transducer described in this invention.

Low cost, low power integrated circuit converters are presently limited to 16 bit resolution, which is theoretically equivalent to 96 dB, however, their performance is limited by noise and distortion to 5-10 dB less than this. Therefore, the dynamic range of the input signal substantially exceeds the dynamic range of the those conventional A/D converters suitable for incorporation into a hand-held or remotely powered transducer 100.

The system of FIG. 4 provides a solution to this problem by the use of a sub-ranging conversion technique. A digitally controllable variable gain stage, 400, is placed between transducer 100 and linear 16 bit (or more) A/D converter 416. Such a device could be a programmable gain amplifier, a multiplying digital/analog converter (MDAC), or an analog multiplier driven by a linear digital to analog (D/A) converter. The preferred method is to use an MDAC.

The gain control input 408 to the variable gain element 400 is a digital word stored in a gain register, 406, which will control the amount of gain that the signal input 106 experiences before entering the A/D converter 416. In this way, large inputs may be scaled down to fit the input level of the A/D converter 416 without clipping. Conversely, small inputs may be amplified sufficiently to fully utilize the 16 bit resolution of the A/D converter 416. The gain shifting may be under control of an automatic gain control system, or a manual peak holding system such as are well known to those of skill in the art.

The preferred technique uses a local microprocessor or digital A/D controller, 412, connected to the output 420 of the A/D converter 416. The controller 412 periodically or continuously montors the output 420 of the A/D converter 416 and senses overload or low signal level conditions. When the digital output of A/D converter 416 exceeds a present threshold, the controller 412 decreases the signal level by decrementing the gain register 406. Conversely, when the output 420 of A/D converter 416 falls below a second, lower, present threshold, controller 412 decrements the gain register 406. The output 410 of this digital interface 412 controls the gain word register 406, which, in turn, operates the gain control input 408 of variable gain element 400.

The value gain or loss word at output 410 is also multiplexed with the A/D converter output 420 in the interface circuit 412. This gain word, forms the most significant N bits of the output word. The remaining least significant M bits come from the output of A/D converter 416. The output 422 of the a/d controller has a resolution of M plus N bits. This is commonly known as a sub-ranging converter.

The preferred technique is to use a 16 bit A/D converter 416 and gain steps of $+/-6$ dB in the variable gain element 400. A microprocessor or programmable logic array is used as the A/D controller 412. It will shift the 16 bit A/D converter 416 output data left or right within a 24 bit output word, by the content of gain register 406, depending upon the magnitude of A/D converter 416 output 420. Each shift represents a 6 dB gain or loss applied by the variable gain element 400. This system provides a theoretical 144 dB (24 bit) dynamic range, sufficient for all signals encountered in the real world, such as music, speech, vibration, percussion, etc. The linear coded PCM output of the A/D converter, 412, is easily interfaced with existing microprocessors, and other audio equipment.

Figure 5:
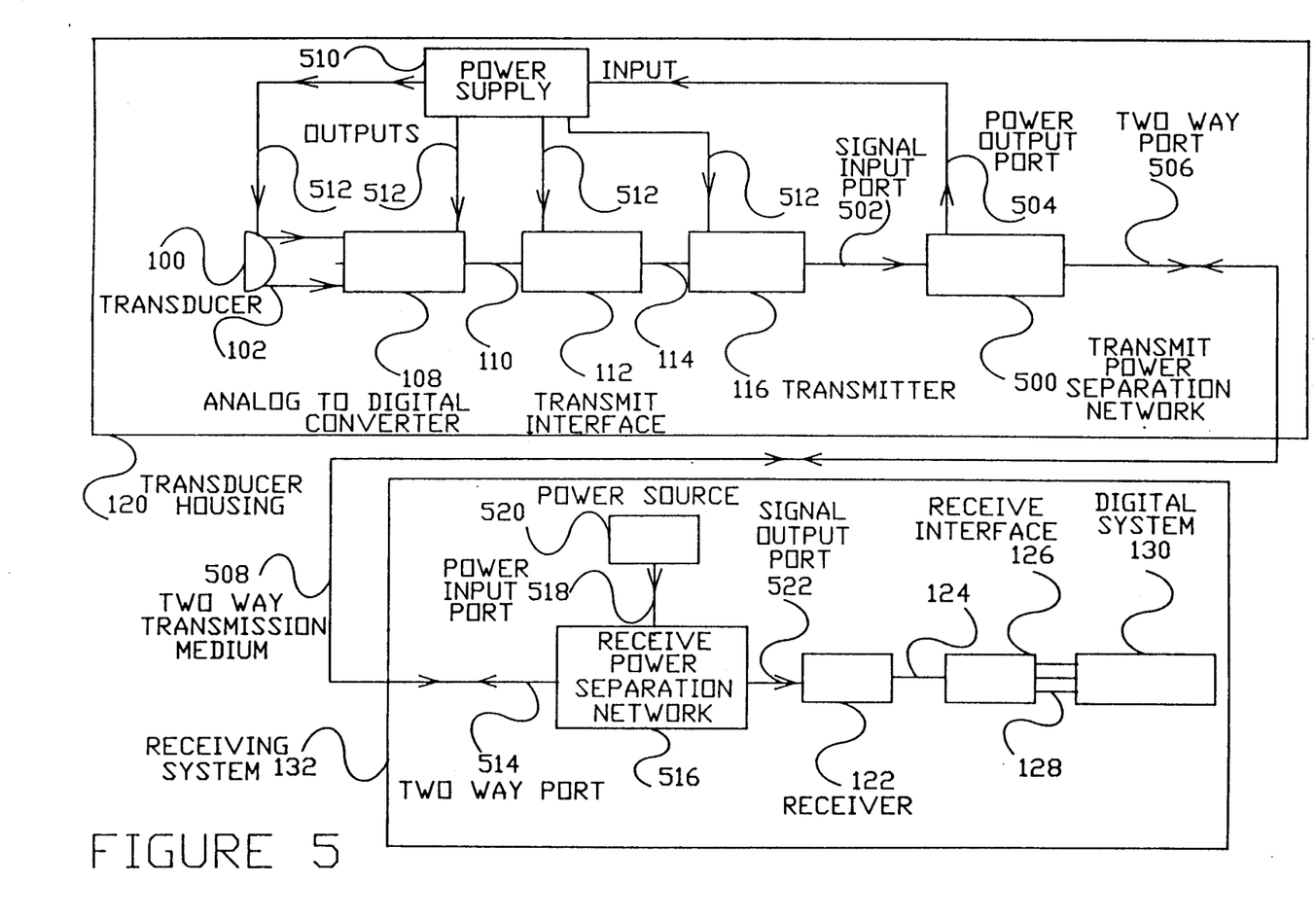
FIG. 5 is a block diagram of the system showing additional circuitry necessary for remotely powering the digital output transducer through a two-way signal transmission medium.

DESCRIPTION—FIG. 5—TRANSDUCER POWERED FROM THE TRANSMISSION MEDIUM

The power source for the digital output transducer may be derived from the transmission medium itself in those cases where the transmission medium can conduct energy in both directions such as a cable or an optical fiber. The digital output transducer transmits information in one direction, from the transmitter to the reeiver, while being powered from energy flowing from the receive system 132 to the transmit side of the medium. In embodiments with a cable with bi-directional data transmission, the digital pulses applied to the cable by the receive system 132 are rectified and filtered in the transducer in order to derive power from them.

For a transmission medium like an optical fiber, it is possible for light to travel along it in two directions at once. A strong light source, such as a laser diode, could be impressed on the fiber at the receive end. The transmission efficiency of optical fibers can be higher than 90%, even for distances of hundreds of feet. Thus, substantial optical power is available at the transducer end of the fiber. A suitable photovoltaic diode, located in the transducer and coupled to the optical fiber, is used to convert the incoming light into electrical power for operating the transducer.

In the event that these power sources are not sufficient to operate the digital output transducer for an extended period of time, intermittent operation can be obtained by the use of a storage battery or capacitor, to accumulate this energy on a continuous basis, thus providing higher power for the digital output transducer only during its period of use.

Referring now to FIG. 5, the additional components for realizing this technique include a two-way transmission medium, 508, and a power source 520, which is applied to the receive side 514 of the transmission medium 508, by a recieve power separation network 516. The power is transmitted in the direction from receive system 132 towards transducer 120. A transmit power separation network 500 is connected to the medium 508 and separates the received power onto port 504, while allowing the transmitter 116 output to pass from the signal input port 502 to the medium 508 via the two way port 506. In the preferred embodiment, the power separation networks consist of passive LCR and transformer networks, and the transmission medium is by cable.

The transmit power separation network provides transmission of DC power from the two-way port to the power output port, but blocks this path from the signal port to the power port. Such devices as hybrids, directional couplers, and the like are well known to those who are skilled in the communications art. The signal can pass freely from the signal port to the two-way port. The receive power separation network performs a similar but inverse function, as is obvious to those who are skilled in the communications art.

For optical transmission, commercially available fiber optic directional couplers are used with a fiber and a laser diode on light emitting diodes, thus providing similar functionality. The power output 504 of the transmit power separation network 500 is attached to a power supply 510 input, located in the transducer, 120. Power supply 510 takes the power separated from the medium 508 by the transmit power separation network 500, and converts it to voltage required by the various parts of the digital output transducer. These outputs 512 go to the power input of the transducer 100, A/D converter 108, transmit interface 112, and the transmitter 116.

SUMMARY, RAMIFICATIONS, AND SCOPE

Thus, the reader will see that the invention provides a system that can be used to provide a high quality, digital output, transducer within a hand-held housing. It can be used for the transmission of sound, vibration, or other varying energy over a medium, such as a cable, optical fiber, or by radio waves, by digital means, and without degradation of the signal from noise or distortion. The invention provides a digital output transducer, which can be hand-held, is low in cost, small in size and weight, and low in power consumption. In addition, the signal can be transmitted over a single path medium in industry standard form by the use of serial transmission with clocks and frame pulses multiplexed together with the data, on a single line.

In the preferred embodiment, the output of the transducer consists purely of serial digital data on a single transmission line. This may be transmitted by a conventional cable or by a wireless link, such as infrared, fiber optic, radio signal, etc. The serial data is received and, in the case of wireless transmission, is converted back from wireless from to an electrical signal by a receiver, and is then applied to a digital system, which can receive and interpret the serial data from the receiver as being an accurate representation of the originally generated analog signal.

In addition, the digital output transducing system may include within the transducer housing a digital signal processor, in the form of an integrated circuit, for performing functions such as: frequency or amplitude modification, noise reduction, gain control, and so on, in an intelligent manner and under local control at the transducer, or by remote control by the receiving system.

The sample rate of the conversion and the operation of the digital signal processor may be remotely controlled via commands transmitted to the transducer over the same transmission medium used to receive data from the transducer.

The A/D conversion technique includes a method for extending the dynamic range of the system up to 24 bits, which is more than sufficient for any "real world" transducing application. The invention uses a low power, low cost analog-to-digital conversion methods that eliminate the need for low pass filters or sample-and-hold circuits.

The system includes provisions for self-contained power source, as well as for powering the transducer over the same cable that transmits the data to a digital system at a location remote from that of the transducer.

Although several preferred embodiments have been shown and described, additional variations are possible. For example, the transducer element can convert light or mechanical vibration into electricity, instead of sound waves. Therefore, the scope of the invention should be determined by the appended claims and their legal equivalents, and not by the examples given.

We claim:

1. A transducer system for communicating varying energy by digital means, comprising:
    (a) a housing,
    (b) transducer means within said housing for converting varying input energy supplied to said transducer means into an analog electrical output signal,
    (c) analog-to-digital converter means within said housing for sampling said analog electrical output signal from said transducer periodically, and for converting the resultant periodic samples of said analog electrical signal into a sequence of groups of digital bits which represent the values of said analog electrical signal at (the) each respective periodic (times) (of) sampling time,
    (d) transmission means in said housing for transmitting said sequence of digital bits to a location remote from said housing,
    (e) reception means at said remote location for receiving the transmitted sequence of said groups of digital bits, and
    (f) a digital system at said remote location connected to said reception means for utilizing said received sequence of digital bits,
    whereby said varying input energy will be converted into said sequence of digital bits, transmitted to said remote receiver in digital form, and utilized in digital form by said digital system located at said remote location so as to be able to transmit said varying input energy faithfully.

2. The system of claim 1, wherein said transmission medium is capable of two way transmission, further including a power source at the receive side of said transmission medium, a receive power separation network, said receive power separation network including a power input port, a signal output port, and a two-way port, said receive power separation network connected between said transmission medium and said reception means, said power source connected to said power input port of said receive power separation network, a transmit power separation network connected after said transmitter output, said transmit power separation network further including a power output port, a transmit input port and a two-way port, a power supply with an input port and an output port, said power separation network and said output port being connected to said input port of said power supply, said power supply said output port being connected to at least one component of said digital output transducer, whereby said digital output transducer will be powered by a power source which is located remotely from said digital output transducer such that the said digital output transducer will receive power over said transmission medium.

3. The system of claim 1 wherein said transducer means is a microphone.

4. The system of claim 1 wherein said digital system located at said remote location includes a digital-to-analog converter for reconstructing said analog electrical signal.

5. The system of claim 1 further including a transmission means comprising a pair of electrical conductors.

6. The system of claim 1 wherein said analog-to-digital converter comprises:
   (a) variable gain means with an input and an output whose gain is controlled by a digital gain word having a length of M-bits, where M is an integer,
   (b) a linear pulse-code-pulse-modulation analog-to-digital converter of N-bit resolution, where N is an integer, for receiving the output of said variable gain means and for periodically sampling the output of said variable gain means and for converting said samples of the output of said variable gain means into a sequence of digital words, each of which represents the value of a respective sample of said output of said variable gain means, and
   (c) a digital interface for receiving the output of said analog-to-digital conversion means and generating said digital gain words for controlling the gain of said variable gain means and for generating a digital output word of length M plus N bits, said digital output word including the output of said linear pulse code modulation analog to digital converter means and said digital gain word,
   whereby the value of said digital gain word is changed by said digital interface when the digital output of said analog to digital converter means exceeds a predetermined maximum or falls below a predetermined minimum, and
   whereby the output of said digital interface is an M plus N bit digital representation of the varying energy applied to said transducer means, so that the resolution of said M bit plus N bit conversion is substantially increased in relation to the resolution of said linear pulse code modulation.

7. The system of claim 1, further including low-pass filter means and sample-and-hold means, and wherein said transducer means said analog electrical signal is coupled to said low-pass filter means, the output of said low-pass filter means being coupled to said sample-and-hold means, and said sample-and-hold means being coupled to said analog-to-digital converter.

8. The system of claim 1 wherein said transmission medium is transverse electromagnetic waves.

9. The digital output transducer of claim 1 wherein said analog-to-digital converter is an adaptive delta modulation pulse-code modulation analog-to-digital converter and wherein said single serial digital bit stream is coded as adaptive delta modulation pulse-code modulation.

10. The system of claim 1 wherein said transmission medium is an optical fiber.

11. The digital output transducer of claim 1 wherein said single serial digital bit stream is encoded by a polarity insensitive type of modulation.

12. The system of claim 1 wherein said transducer means is a vibration pickup.

13. The system of claim 1 wherein said transmitted sequence of said groups of digital bits includes 24 or fewer bits of linear pulse code modulation data bits, one or more parity bits and one or more synchronization bits for each of said periodic samples, and wherein each of said linear pulse code modulation data bits is represented by a biphase-mark symbol so as to minimize the direct-current component of said transmitted serial digital bit stream.

14. A plurality of transducer systems of claim 1, wherein each of said transmitted sequences of said groups of digital bits is multiplexed onto a common said transmission means, whereby a single transmission means transmits all of said sequences of said groups of digital bits for said plurality of transducer systems.

15. A transducer system for communicating varying energy by digital means, comprising:
   (a) transducer means for converting varying input energy into an analog electrical signal, said analog electrical signal having a given bandwith,
   (b) oversampling analog-to-digital converter means for sampling said analog electrical signal at periodic instants and for converting said sampled analog electrical signal into a sequence of groups of digital bits which represent the respective values of said analog electrical signal at said periodic instants, said sampling being performed at a rate greater than two times said given bandwidth of said analog electrical signal,
   (c) transmit interface means for converting said sequence of groups of digital bits from said oversampling analog-to-digital converter to a single serial digital bit stream,
   (d) transmission means for transmitting said single serial digital bit stream to a location remote from said transducer means,
   (e) a transmission medium for conducting said transmitted single serial digital bit stream to said remote location,
   (f) reception means located at said remote location for receiving said transmitted single serial digital bit stream,
   (g) receive interface means for converting said single serial digital bit stream into a sequence of groups of digital bits corresponding to groups of digital bits applied to said transmit interface, and
   (h) a digital system connected to said reception means for utilizing said output of said receive interface, whereby said varying energy is converted to a digital signal, transmitted to said remotte receiver in digital form as a single serial digital bit stream, and utilized by said digital system located at said remote location, such that said transmission will be performed in a highly faithful manner.

16. The system of claim 15, further including a continuously variable frequency digital clock rate generator whose output is connected to said analog-to-digital converter, whereby the sample rate of said analog-to-digital converter is continuously variable so that the frequency bandwidth of said transducer is continuously variable.

17. The system of claim 15 wherein said single serial digital bit stream includes 24 or fewer bits of linear pulse code modulation data bits, one or more parity bits and one or more synchronization bits for each of said sample points, and wherein each of said linear pulse code modulation data bits is represented by a biphase-mark symbol so as to minimize the direct-current component of said transmitted serial digital bit stream.

18. A transducer system for communicating acoustic signals by digital means comprising:

(a) a housing, (b) transducer means within said housing for converting an acoustic signal into an analog electrical output signal from said transducer, (c) analog-to-digital converter means within said housing for sampling said analog electrical output signal at periodic instants and for converting the sampled analog electrical output signal into a sequence of groups of digital bits which represent the respective values of said analog electrical output signal at said periodic instants, (d) digital signal processing means located within said housing for modifying said sequence of groups of digital bits, (e) means for storing a program for controlling said digital signal processing means, (f) transmission means for transmitting said sequence of groups of digital bits to a location remote from said transducer means, (g) reception means located at said remote location for receiving said sequence of groups of digital bits transmitted by said transmission means, and (h) a digital system at said remote location, said digital system being connected to said reception means for utilizing said received sequence of groups of digital bits, whereby said acoustic signal is converted to a digital signal, transmitted to said remote receiver in digital form, and utilized by said digital system located at said remote location such that said digital system at said remote location receives a highly faithful digital representation of said acoustic signal.

19. The system of claim 18 wherein said analog-to-digital converter means and said digital signal processing means are comprised of a single integrated circuit.

20. The system of claim 18, further including a command transmitter coupled to the receive end of said transmission medium, and a command receiver located in said housing, with an input port and an output port, said command receiver said input port is coupled to said transmission medium, said output port coupled to said digital signal processor located in said housing, whereby said digital signal processor will be responsive to said command transmitter.

* * * * *

(12) EX PARTE REEXAMINATION CERTIFICATE (8948th)
United States Patent
Paul et al.

(10) Number: US 5,051,799 C1
(45) Certificate Issued: Apr. 10, 2012

(54) DIGITAL OUTPUT TRANSDUCER (75) Inventors: Jon D. Paul, San Francisco, CA (US);
Mark D. Clayton, New Windsor, NY (US); Anthony M. Agnello, Princeton, NJ (US)

(73) Assignee: Digital Technology Licensing LLC, Suffern, NY (US)

Reexamination Request:
No. 90/010,614, Jul. 23, 2009

Reexamination Certificate for:
Patent No.: 5,051,799
Issued: Sep. 24, 1991
Appl. No.: 07/313,069
Filed: Feb. 17, 1989

(51) Int. Cl.
*H04B 14/04* (2006.01)
*H04R 1/04* (2006.01)
*H04R 3/00* (2006.01)

(52) U.S. Cl. .................. 375/242; 375/247; 381/355; 381/365

(58) Field of Classification Search ................. None
See application file for complete search history.

(56) References Cited

To view the complete listing of prior art documents cited during the proceeding for Reexamination Control Number 90/010,614, please refer to the USPTO's public Patent Application Information Retrieval (PAIR) system under the Display References tab.

*Primary Examiner* — Margaret Rubin (57) ABSTRACT

Contained within a single housing (120), is a transducer (100) for receiving an acoustic signal, an analog-to-digital converter (108), which changes the output of transducer (100) into a series of digital pulses representing the incoming acoustic signal. The output of the system may be in serial form. This serial output (114) is transmitted (116) to a remote receiver (122) by wires, light, optical fibers, or as radio waves. The receiver's (122) output (124) is applied to a digital system (130), which processes or reconstructs the acoustic signal. The system may include a digital signal processor (300) within the housing (120) for processing the signal (110) prior to transmission. The analog to digital converter may be a delta-sigma oversampling type, or a subranging floating point type, or use adaptive differential pulse code modulation. Power may be derived remotely by transmission over the signal medium.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 18 and 20 are cancelled.
Claims 1-17 and 19 were not reexamined.

* * * * *